United States Patent
Toba et al.

(10) Patent No.: US 7,839,665 B2
(45) Date of Patent: Nov. 23, 2010

(54) SYSTEM INTERCONNECTION INVERTER INCLUDING OVERVOLTAGE AND NEGATIVE VOLTAGE PROTECTION

(75) Inventors: Masahiro Toba, Tokyo (JP); Noriyuki Matsubara, Tokyo (JP); Masanori Kageyama, Tokyo (JP); Hirokazu Nakabayashi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 456 days.

(21) Appl. No.: 11/579,534

(22) PCT Filed: Mar. 27, 2006

(86) PCT No.: PCT/JP2006/006168

§ 371 (c)(1),
(2), (4) Date: Nov. 3, 2006

(87) PCT Pub. No.: WO2007/110913

PCT Pub. Date: Oct. 4, 2007

(65) Prior Publication Data

US 2008/0304298 A1    Dec. 11, 2008

(51) Int. Cl.
    *H02H 7/122* (2006.01)
(52) U.S. Cl. ............... 363/56.01; 363/55; 363/142; 307/127; 361/64
(58) Field of Classification Search ........... 363/56.01, 363/55, 142; 307/127; 361/84
    See application file for complete search history.

(56) References Cited

U.S. PATENT DOCUMENTS

| | | | |
|---|---|---|---|
| 6,498,320 B2* | 12/2002 | Moriguchi et al. | 219/130.21 |
| 6,507,004 B2* | 1/2003 | Ikeda et al. | 219/130.21 |
| 6,665,200 B2* | 12/2003 | Goto et al. | 363/55 |
| 6,678,174 B2* | 1/2004 | Suzui et al. | 363/55 |
| 2002/0085325 A1 | 7/2002 | Suzui et al. | |
| 2002/0141124 A1* | 10/2002 | Ito et al. | 361/84 |
| 2007/0291522 A1* | 12/2007 | Toba et al. | 363/132 |

FOREIGN PATENT DOCUMENTS

| | | |
|---|---|---|
| JP | 6-311758 A | 11/1994 |
| JP | 6-348350 A | 12/1994 |

(Continued)

OTHER PUBLICATIONS

International Search Report dated May 16, 2006 (with English translation of category of cited documents).

(Continued)

*Primary Examiner*—Edward Tso
*Assistant Examiner*—Manuel Hernandez
(74) *Attorney, Agent, or Firm*—Buchanan Ingersoll & Rooney PC (57) ABSTRACT

A system interconnection inverter includes a step-up converter and an inverter. Moreover, the system interconnection inverter includes a short-circuit current-interrupting diode with a cathode connected to an input terminal of a negative bus, a semiconductor switch connected to an anode of the short-circuit current-interrupting diode, a semiconductor switch drive circuit that drives the semiconductor switch, a semiconductor switch-off circuit that turns off the semiconductor switch drive circuit when negative power is applied such that electric current flows from a cathode toward an anode of the input terminal, and a control circuit that controls the semiconductor switch drive circuit.

8 Claims, 3 Drawing Sheets

FOREIGN PATENT DOCUMENTS

| | | |
|---|---|---|
| JP | 07-322484 | 12/1995 |
| JP | 11-196527 A | 7/1999 |
| JP | 2001-186664 A | 7/2001 |
| JP | 2002-1124488 A | 4/2002 |

OTHER PUBLICATIONS

Written Opinion of the International Searching Authority.
Supplementary European Search Report in Application No. 06730116.8-1231 dated Feb. 13, 2009.

* cited by examiner

FIG.4

SYSTEM INTERCONNECTION INVERTER INCLUDING OVERVOLTAGE AND NEGATIVE VOLTAGE PROTECTION

TECHNICAL FIELD

The present invention relates to an inverter, and, more particularly to a system interconnection inverter that interconnects DC power from a solar cell, a fuel cell, or the like to an AC power system.

BACKGROUND ART

A conventional system interconnection inverter has been disclosed, for example, in Patent Document 1. In this system interconnection inverter, a step-up converter, to which DC power is input, is connected to an inverter formed of a switching element in a full-bridge configuration via an interstage capacitor, and an output of the inverter is connected to the AC power system via a filter. The system interconnection inverter includes an inverter protector that stops oscillation operation of the step-up converter and the inverter when overvoltage or overcurrent occurs inside the system interconnection inverter, and a capacitor discharger that discharges accumulated charges of an output capacitor equipped in the filter, based on the output of the inverter protector.

Furthermore, a conventional protection circuit for a DC power supply line has been disclosed, for example, in Patent Document 2. In this protection circuit, when electric current supplied from a DC power supply circuit to a load circuit abnormally increases, an overcurrent and overheat protection element inserted in the DC power supply line is tripped (made to take a protective action), to interrupt the electric current flowing in the load circuit, thereby protecting the load circuit. In this protection circuit, a fuse and the like can be omitted, and when a fault is restored, the DC power supply line can be automatically restored.

Patent Document 1: Japanese Patent Application Laid-Open No. 2001-186664
Patent Document 2: Japanese Patent Application Laid-Open No. H11-196527

DISCLOSURE OF INVENTION

Problem to be Solved by the Invention

The conventional system interconnection inverter represented by, for example, Patent Document 1, includes an inverter protector that immediately stops oscillation operation of a step-up converter and an inverter, when overvoltage or overcurrent occurs.

However, when an AC power system, which is an electric power system to be interconnected to an output side of the system interconnection inverter, is wrongly connected to an input side of the system interconnection inverter, or when an anode and a cathode of DC power on the input side are wrongly reverse-connected to apply negative power (negative power means an applied voltage when electric current flows from the cathode to the anode in the circuit), even if the abnormality is detected by the inverter protector to perform abnormal stop of the oscillation operation of the step-up converter, a short-circuit path is formed from a cathode of an input terminal via a free wheel diode (FWD) antiparallel-connected to a switching element for voltage step-up in the step-up converter to an anode of the input terminal. As a result, the free wheel diode causes a short-circuit failure by a short-circuit current due to the negative power, thereby also causing a failure of the switching element for voltage step-up.

One method for preventing this type of short-circuit failure is to protect the free wheel diode and the switching element for voltage step-up by a simple method of providing a fuse in the short-circuit path. However, if the AC power is wrongly applied to the input side or the anode and the cathode of DC power are wrongly reverse-connected, fusing occurs, and replacement of the fuse becomes inevitable.

Particularly, such misconnection frequently occurs when the system interconnection inverter is installed on site. If fusing occurs, the service persons need to consider even causes other than misconnection. For example, in addition to considering replacement of the fuse, it also becomes necessary to check whether the switching element for voltage step-up has been normally operating. Accordingly, restoration operation on site and continuation of installation operation become difficult, thereby causing work delay.

When fusing occurs, the function of the system interconnection inverter completely stops. Therefore, warning to field workers cannot be issued, and it cannot be easily specified whether the cause of the abnormality of the system interconnection inverter is the misconnection.

On the other hand, in the protection circuit for the conventional DC power supply line, for example, as described in Patent Document 2, the overcurrent and overheat protection element is serially inserted in the power supply line. However, there is no overcurrent and overheat protection element for high voltage and large current application. Even if there is such an element, there is a great problem at the time of use. In other words, such type of element generally includes a resistor of several ohms, and when an output of, for example, a solar cell is assumed to be DC 700 volts and 20 amperes and is used for the system interconnection inverter, a large loss of about several hundred watts occurs constantly. Therefore, the overcurrent and overheat protection element as in the conventional art cannot be applied to the system interconnection inverter, which requires high efficiency.

The present invention has been achieved to solve the above problems. It is an object of the present invention to provide a system interconnection inverter that can protect a switching element for voltage step-up and the like without deteriorating the efficiency and without using an overcurrent protection element such as a fuse, even when a negative voltage is applied to an input side due to misconnection, and does not have any problem in normal operation immediately after correcting the misconnection.

Means for Solving Problem

To solve the above problems, and to achieve the above objects, a system interconnection inverter comprising a converter that performs at least one of step-up and step-down of DC power, an inverter that inverts an output of the converter to AC power, and a pair of serially connected capacitors to be inserted to between a pair of DC buses that connects respective input terminals of the DC power to the converter, to interconnect an output of the inverter with an AC power system, wherein the system interconnection inverter further comprises a short-circuit current-interrupting diode inserted in a direction that does not interrupt flow of electric current made to flow to the pair of DC buses by DC power connected with correct polarity, at either one of input terminals of a positive bus and a negative bus constituting the pair of DC buses; a semiconductor switch connected to one end of the short-circuit current-interrupting diode when the other end of the short-circuit current-interrupting diode is connected to an input terminal of the DC power; a semiconductor switch drive circuit that drives the semiconductor switch; a semiconductor switch-off circuit that turns off the semiconductor switch drive circuit when negative power is applied such that electric current flows from a cathode toward an anode of the input terminal; and a control circuit that controls the semiconductor switch drive circuit.

EFFECT OF THE INVENTION

The system interconnection inverter according to the present invention can interrupt short-circuit current flowing through the free wheel diode of a semiconductor switch equipped, for example, in a converter without using the overcurrent protection element such as a fuse, since a short-circuit current-interrupting diode is provided on either a positive DC bus or a negative DC bus constituting a pair of DC buses. Further, a semiconductor switch-off circuit that forcibly turns off a semiconductor switch drive circuit that drives the semiconductor switch, when the semiconductor switch is connected to the short-circuit current-interrupting diode, and negative power is applied such that the electric current flows from the cathode to the anode of the input terminal of the DC power, is included. Accordingly, even when the AC power or the DC power is misconnected, a safe and reliable stopped state can be maintained without operating the converter and the inverter.

EXPLANATIONS OF LETTERS OR NUMERALS

| | |
|---|---|
| 1, 30 | DC power |
| 2 | System interconnection inverter |
| 3 | Short-circuit current-interrupting diode |
| 4 | Semiconductor switch |
| 5 | Semiconductor SW drive circuit |
| 6 | Relay |
| 7 | Semiconductor SW-off circuit |
| 8a, 8b | Input capacitor |
| 9a, 9b | Voltage monitor |
| 10a, 10b | Reactor for step-up converter |
| 11a, 11b | Semiconductor switch |
| 12a, 12b | Diode for step-up converter |
| 13a, 13b | Capacitor for step-up converter |
| 14 | Inverter |
| 15 | Control circuit |
| 16 | AC power |
| 17, 18 | DC Input terminal |
| 19 | Positive bifurcated end |
| 20 | Negative bifurcated end |
| 21 | Power supply for control circuit |
| 22 | Power capacitor for control circuit |
| 23 | Alarm |
| 24 | Charging diode |
| 25 | Discharging transistor |

-continued

| | |
|---|---|
| 26 | Discharging photo-coupler |
| 27 | Bypass diode |
| 28 | Power capacitor for drive circuit |
| 29 | Step-up converter |
| 31, 32 | AC output terminal |
| 34, 35 | DC bus |

BEST MODE(S) FOR CARRYING OUT THE INVENTION

Exemplary embodiments of a system interconnection inverter according to the preset invention will be explained in detail below with reference to the accompanying drawings. The present invention is not limited by the embodiments. Circuit configurations explained below are exemplary, i.e., the circuit configurations can be modified in various manners without departing from the technical scope of the invention.

First Embodiment

Figure 1:
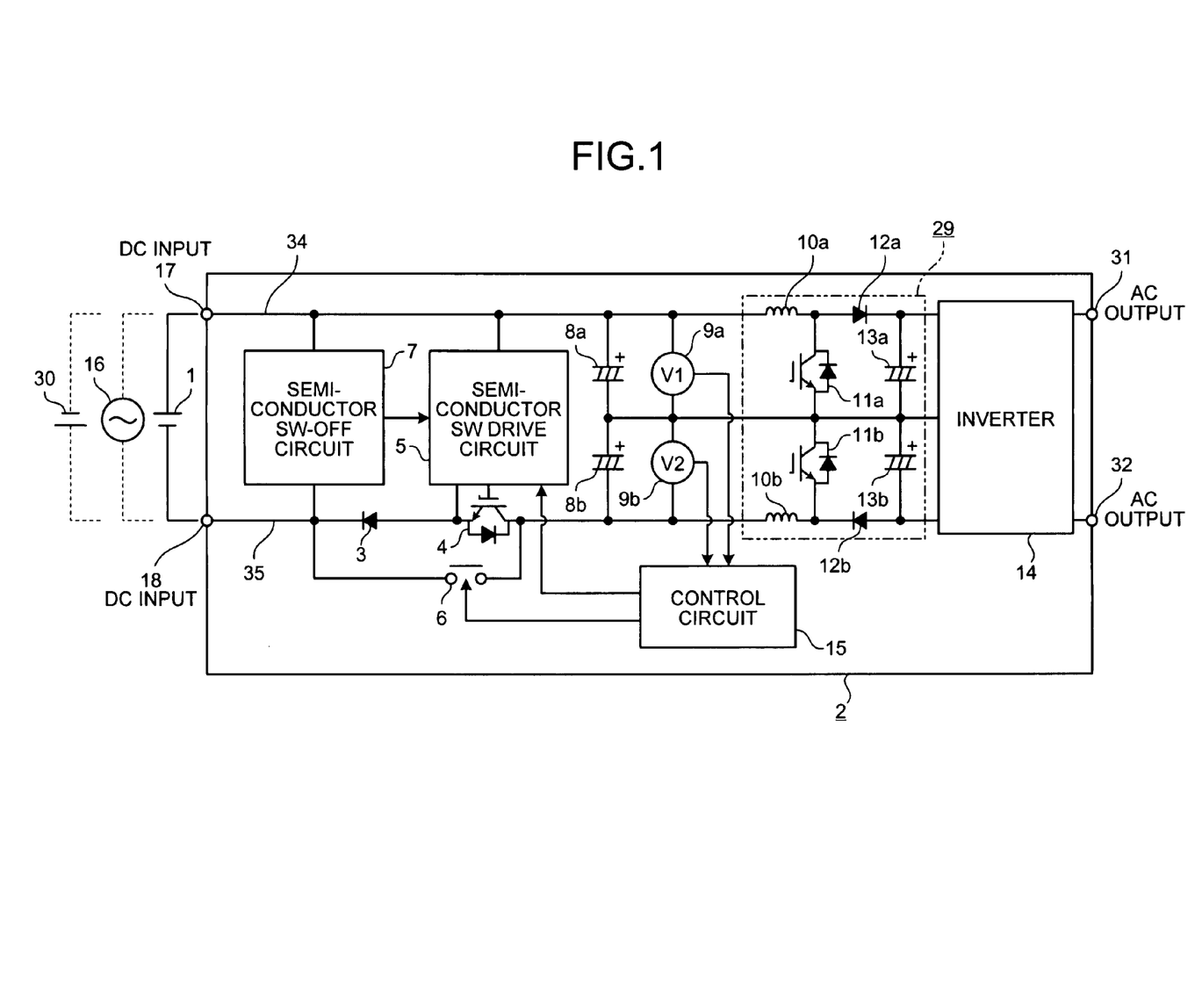
FIG. 1 is a circuit diagram of a system interconnection inverter according to a first embodiment of the present invention.

FIG. 1 is a circuit diagram of a system interconnection inverter according to a first embodiment of the present invention. FIG. 1 depicts DC power 1, which is, for example, an output of a solar cell or a fuel cell, connected to DC input terminals 17 and 18 of a system interconnection inverter 2, a connection mode of which is normal. AC power 16 represents a wrong connection, i.e., in a correct connection the AC power is connected to an output of the system interconnection inverter 2. Moreover, DC power 30 represents a wrong connection, i.e., in a correct connection the DC power is connected in a manner shown by the DC power 1.

The system interconnection inverter 2 shown in FIG. 1 includes input capacitors 8a and 8b, a step-up converter 29, and an inverter 14, which are representative components of the system interconnection inverter. The step-up converter 29 includes reactors 10a and 10b for the step-up converter, semiconductor switches 11a and 11b in which a diode is antiparallel-connected to a semiconductor switching element such as an IGBT, diodes 12a and 12b for the step-up converter, and capacitors 13a and 13b for the step-up converter. The system interconnection inverter 2 of the first embodiment includes following components characterizing the present invention are included in addition to these components.

Firstly, a semiconductor switch-off circuit (hereinafter, "semiconductor SW-off circuit") 7 and a semiconductor switch drive circuit (hereinafter, "semiconductor SW drive circuit") 5 are connected between a positive DC bus 34 connected to the DC input terminal 17 and a negative DC bus 35 connected to the DC input terminal 18, in order of being closer to the DC input terminals 17 and 18. Further, voltage monitors 9a and 9b that respectively monitor a terminal voltage of the input capacitors 8a and 8b are provided toward AC output terminals 31 and 32, and the outputs thereof are input to a control circuit 15 that controls the semiconductor SW drive circuit 5 and a relay 6 described later. A short-circuit current-interrupting diode 3 is provided on the negative DC bus 35 in a direction that does not interrupt the electric current flowing at the time of connecting the DC power correctly (that is, as shown by the DC power 1 in FIG. 1). That is, the short-circuit current-interrupting diode 3 is connected so that a cathode thereof faces the DC input terminal 18 side. Further, a semiconductor switch 4 in which a diode is antiparallel-connected to the semiconductor switching element such as the IGBT is provided on the negative DC bus 35. The short-circuit current-interrupting diode 3 and the semiconductor switch 4 are connected to each other with respective anodes confronting with each other. The short-circuit current-interrupting diode 3 is inserted between a node on the DC bus 35 to which the semiconductor SW-off circuit 7 is connected and a node on the DC bus 35 to which the semiconductor SW drive circuit 5 is connected, while the semiconductor switch 4 is inserted between a node on the DC bus 35 to which the semiconductor SW drive circuit 5 is connected and a node on the DC bus 35 to which the input capacitor 8b is connected. The relay 6 is connected to opposite ends of a series circuit formed of the short-circuit current-interrupting diode 3 and the semiconductor switch 4.

A relay can be respectively parallel-connected to each of the short-circuit current-interrupting diode and the semiconductor switch, instead of connecting the relay 6 to the opposite ends of the series circuit formed of the short-circuit current-interrupting diode 3 and the semiconductor switch 4.

With respect to the circuit configuration shown in FIG. 1 in which the short-circuit current-interrupting diode 3, the semiconductor switch 4, and the relay 6 are inserted or connected to the negative DC bus 35, the short-circuit current-interrupting diode 3, the semiconductor switch 4, and the relay 6 can be inserted or connected to the positive DC bus 34, though it is not a general configuration. In this case, however, the short-circuit current-interrupting diode 3 is inserted between a node on the DC bus 34 to which the semiconductor SW-off circuit 7 is connected and a node on the DC bus 34 to which the semiconductor SW drive circuit 5 is connected, while the semiconductor switch 4 is inserted between a node on the DC bus 34 to which the semiconductor SW drive circuit 5 is connected and a node on the DC bus 34 to which the input capacitor 8a is connected, the short-circuit current-interrupting diode 3 and the semiconductor switch 4 are connected to each other with respective cathodes confronting with each other, and the relay 6 is connected to the opposite ends of the series circuit formed of the short-circuit current-interrupting diode 3 and the semiconductor switch 4.

Instead of the configuration shown in FIG. 1, either the short-circuit current-interrupting diode 3 or the semiconductor switch 4 can be provided on the positive DC bus 34. For example, when the short-circuit current-interrupting diode 3 is provided on the positive DC bus 34, the short-circuit current-interrupting diode 3 is inserted between the node on the DC bus 34 to which the semiconductor SW-off circuit 7 is connected and the node on the DC bus 34 to which the semiconductor SW drive circuit 5 is connected. When the semiconductor switch 4 is provided on the positive DC bus 34, the semiconductor switch 4 is provided between the node on the DC bus 34 to which the semiconductor SW drive circuit 5 is connected and the node on the DC bus 34 to which the input capacitor 8a is connected, and the relay is provided at respective opposite ends thereof.

A characteristic configuration and operation of the interconnection inverter according to the first embodiment shown in FIG. 1 are explained next.

As described above, the short-circuit current-interrupting diode 3 is provided on the DC bus 35. With this configuration, when the AC power is misconnected to the input side, or when the polarities of the DC power are wrongly connected, the short-circuit current flowing through the free wheel diode (FWD) in the semiconductor switches 11a and 11b of the step-up converter 29 can be interrupted without using an over-current protection element such as a fuse.

The semiconductor switch 4 serially connected to the anode of the short-circuit current-interrupting diode 3 includes a function of automatically turning on the semiconductor switch 4 itself when normal DC power is applied up to a certain voltage, for example, 10 to 30 volts or higher. The on and off of the semiconductor switch 4 is also controlled by the semiconductor SW drive circuit 5, which is controlled by the control circuit 15. On the other hand, when negative power is applied due to the misconnected AC power 16 or due to the reverse-connected DC power 30 on the DC input terminal side, the semiconductor SW-off circuit 7 forcibly operates to forcibly stop the semiconductor SW drive circuit 5, to turn off the semiconductor switch 4.

According to this action, even if the AC power or the DC power is misconnected, negative power is not applied to the input capacitors 8a and 8b, and since rush current does not flow, the input capacitors 8a and 8b are not charged. As a result, the step-up converter 29 and the inverter 14 do not operate, thereby configuring a protection circuit that can maintain a safe and reliable stopped state. Since the input capacitors 8a and 8b are not charged, even when the misconnection is corrected immediately, electrification does not occur.

The control circuit 15 controls the semiconductor SW drive circuit 5 and the relay 6 based on the terminal voltage of the input capacitors 8a and 8b monitored by the voltage monitors 9a and 9b. When the normal DC power 1 is applied to a certain voltage or higher, the semiconductor switch 4 is automatically turned on, but at this point in time, the relay 6 is in an off state. On the other hand, when the voltage monitors 9a and 9b confirm the normal operation, the control circuit 15 controls to turn on the relay 6 and turn off the semiconductor switch 4.

According to this action, the current path at the time of normal operation of the system interconnection inverter 2 includes the relay 6, and a loss due to the short-circuit current-interrupting diode 3 and the semiconductor switch 4 does not need to be considered. Therefore, a protection circuit in which the efficiency is not deteriorated can be configured with respect to the system interconnection inverter requiring high efficiency.

Since the control circuit 15 controls to turn on the relay 6, only after the voltage monitors 9a and 9b confirm the normal operation, a path bypassing the short-circuit current-interrupting diode 3 (alternate path by the relay 6) is not formed when negative power is applied due to the misconnected AC power 16 or the reverse-connected DC power 30.

According to the system interconnection inverter in the first embodiment, since the short-circuit current-interrupting diode is provided on either the positive DC bus or the negative DC bus constituting the pair of DC buses, for example, the short-circuit current flowing through the free wheel diode of the semiconductor switch equipped in the converter or the like can be interrupted without using the overcurrent protection element such as a fuse. Further, the semiconductor switch-off circuit that forcibly turns off the semiconductor switch drive circuit that drives the semiconductor switch, when the semiconductor switch is connected to the short-circuit current-interrupting diode, and negative power is applied such that electric current flows from the cathode to the anode of the input terminal of the DC power, is included. Accordingly, even when the DC power or the AC power is misconnected, safe and reliable stopped state can be maintained without operating the converter and the inverter.

In the configuration shown in FIG. 1, a desired resistive element can be inserted, for example, between the short-circuit current-interrupting diode 3 and the semiconductor switch 4, or at either end of the series circuit formed of the short-circuit current-interrupting diode 3 and the semiconductor switch 4, to prevent rush current, which may flow when the output of the DC power 1 becomes high voltage (for example, 1000 VDC or higher), from the DC power 1 of high voltage toward the capacitor of approximately zero voltage, at the time of turning on the system interconnection inverter. Even if such a resistive element is inserted, after the semiconductor switch 4 is turned on, the parallel-connected relay 6 is turned on so that the path including the semiconductor switch 4 is bypassed. Therefore, the insertion of the resistive element does not increase the loss.

Second Embodiment

Figure 2:
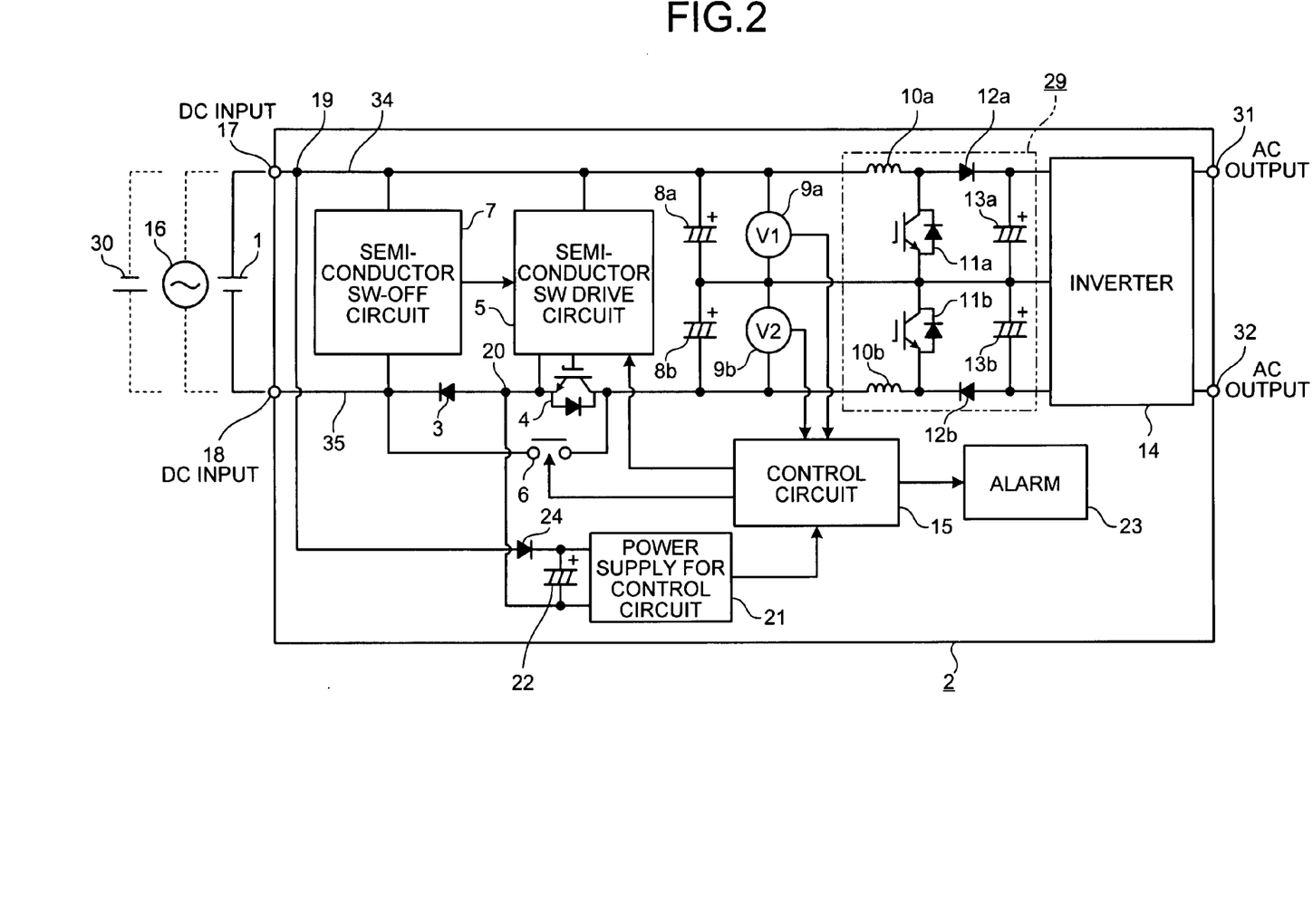
FIG. 2 is a circuit diagram of a system interconnection inverter according to a second embodiment of the present invention.

FIG. 2 depicts a circuit configuration of a system interconnection inverter according to a second embodiment of the present invention. The system interconnection inverter 2 shown in FIG. 2 includes an alarm 23 that issues an alarm with respect to, for example, misconnection to the DC input terminal, and a power supply 21 for the control circuit for operating the control circuit 15, in the configuration of the first embodiment shown in FIG. 1. Further, a power capacitor 22 for the control circuit having a capacity by which half-cycle power of the AC power 16 can be sufficiently charged is connected via a charging diode 24 between a positive bifurcated end 19 on the DC bus 34 and a negative bifurcated end 20 on the DC bus 35 (between ends on respective anode sides of the short-circuit current-interrupting diode 3 and the semiconductor switch 4). Since other configurations are the same or equivalent to the configurations in the first embodiment, like reference signs denote like parts, and detailed explanation regarding the configuration and operation thereof is omitted.

A cathode of the power supply 21 for the control circuit is pulled out from a node (the negative bifurcated end 20) to which respective anodes of the short-circuit current-interrupting diode 3 and the semiconductor switch 4 are connected. As a result, the short-circuit current due to negative power of the AC power 16 is interrupted by the operation of the short-circuit current-interrupting diode 3, and the operation of the semiconductor SW drive circuit 5 is stopped by the operation of the semiconductor SW-off circuit 7. Accordingly, only the control circuit 15 can be operated with the half-cycle power of the AC power 16, while maintaining a safe and reliable stopped state without operating the step-up converter 29 and the inverter 14.

According to this action, the control circuit 15 can detect an abnormality of the power capacitor 22 for the control circuit resulting from application of the AC power 16 through the voltage monitors 9a and 9b, and the alarm 23 connected to the control circuit 15 can issue a desired alarm. Further, by the alarm operation, a warning regarding an abnormality of the system interconnection inverter resulting from misconnection of the AC power can be issued to field workers, and it can be easily specified whether the cause of the abnormality of the system interconnection inverter is the misconnection. For the abnormality detection by the voltage monitors 9a and 9b, for example, a method of comparing an instantaneous value of the terminal voltage of the voltage monitors 9a and 9b with a mean value thereof can be used.

According to the system interconnection inverter in the second embodiment, even when a converter that performs at least one of step-up and step-down of an input voltage supplied from a solar cell is provided, opening or closing of a switching element can be controlled based on the monitored terminal voltage of the capacitor as in the first embodiment, and the same effect as in the first embodiment can be obtained.

Third Embodiment

Figure 3:
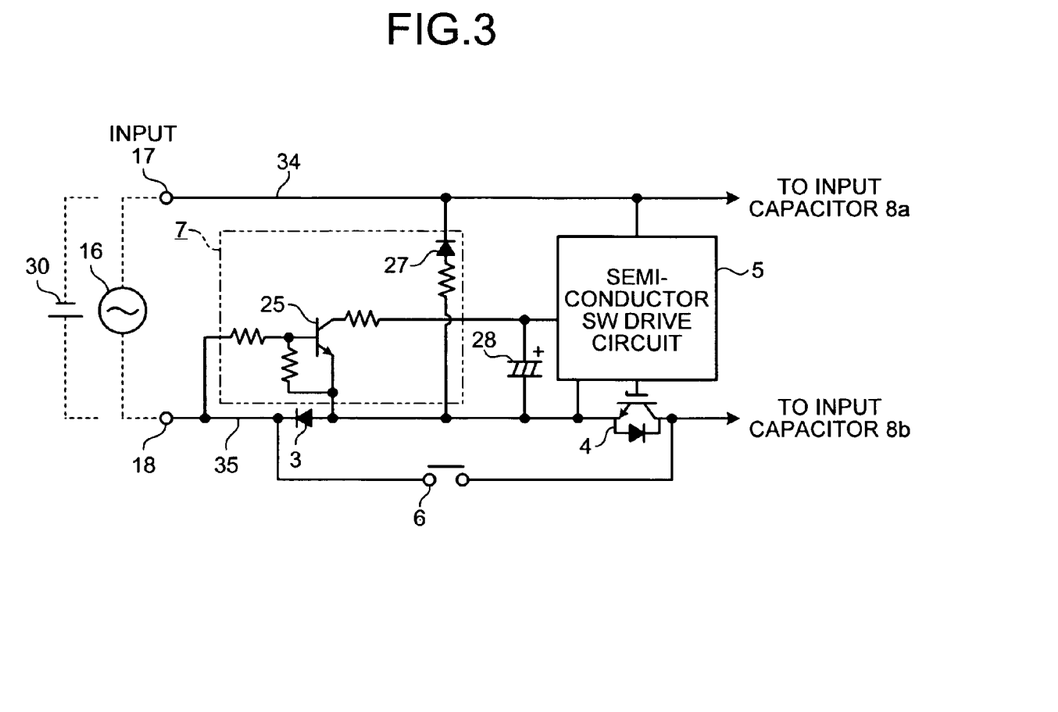
FIG. 3 is an exemplary circuit diagram of a semiconductor SW-off circuit shown in FIGS. 1 and 2.

FIG. 3 is a configuration example of the semiconductor SW-off circuit 7 shown in FIGS. 1 and 2, together with other components relating to the operation thereof. In FIG. 3, the semiconductor SW-off circuit 7 includes a discharging transistor 25 and a bypass diode 27, as major constituting elements thereof. A power capacitor 28 for the drive circuit serving as a power supply for the operation of the semiconductor SW drive circuit 5 is connected to between a collector and an emitter of the discharging transistor 25 via a collector resistor, thereby forming a discharge path of the power capacitor 28 for the drive circuit. Further, a feedback path for base current is formed from the DC input terminal 18 side (cathode side of the short-circuit current-interrupting diode 3) via a base of the discharging transistor 25, the anode of the short-circuit current-interrupting diode 3, and the bypass diode 27, to the DC input terminal 17 side (the DC bus 34).

With this configuration, when the AC power is misconnected, every time negative power is applied to the DC input terminals 17 and 18, the discharging transistor 25 is turned on, to discharge charges of the power capacitor 28 for the drive circuit. On the other hand, when the polarities of the DC power are reverse-connected wrongly, since the negative power is constantly applied to the DC input terminals 17 and 18, the discharging transistor 25 is on all the time, and the power capacitor 28 for the drive circuit is in a discharged state all the time. Due to these effects, the power capacitor 28 for the drive circuit is not charged to a voltage, at which the semiconductor SW drive circuit 5 operates, or higher.

Thus, by configuring the semiconductor SW-off circuit 7 as shown in FIG. 3, even when the DC power or the AC power is misconnected, the semiconductor SW drive circuit 5 does not operate, the semiconductor switch 4 is controlled to turn off, and the relay 6 does not operate. Further, since the semiconductor switch 4 is turned on when the normal DC power is applied to a certain voltage or higher, the semiconductor switch 4 is not turned on with the positive half cycle of the AC power, and the input capacitors 8a and 8b are not charged. As a result, the step-up converter 29 and the inverter 14 do not operate, maintaining a safe and reliable stopped state, and even if the misconnection is corrected immediately, electrification does not occur.

Fourth Embodiment

Figure 4:
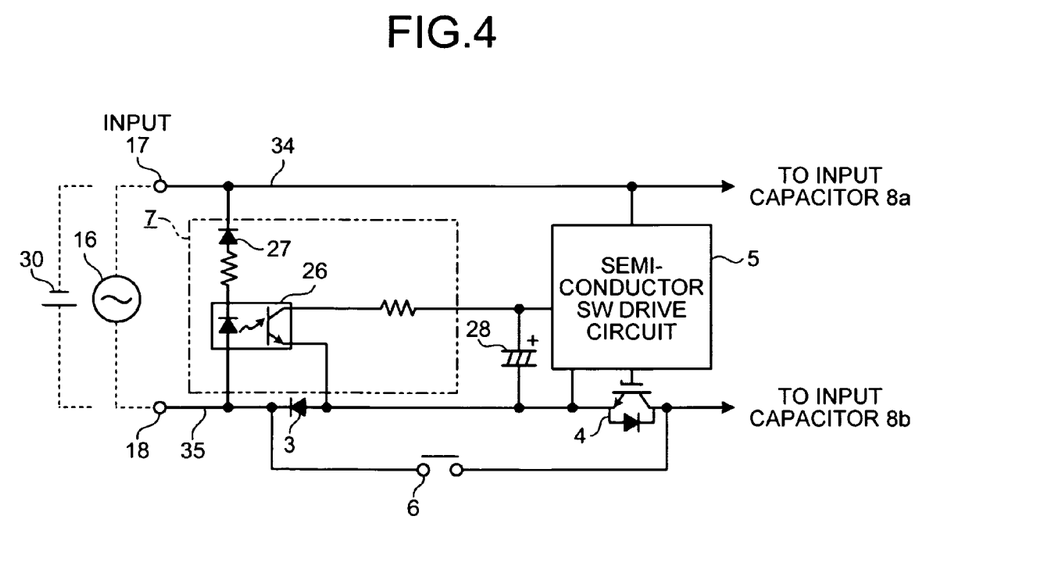
FIG. 4 is another exemplary circuit diagram of the semiconductor SW-off circuit shown in FIGS. 1 and 2, different from the one shown in FIG. 3.

FIG. 4 is another configuration example of the semiconductor SW-off circuit 7 shown in FIGS. 1 and 2, different from the one shown in FIG. 3, together with other components relating to the operation thereof. In FIG. 4, the semiconductor SW-off circuit 7 includes a discharging photo-coupler 26 and the bypass diode 27, as major constituting elements thereof. The power capacitor 28 for the drive circuit is connected to between a collector and an emitter of a secondary photo transistor of the discharging photo-coupler 26 via a collector resistor, thereby forming a discharge path of the power capacitor 28 for the drive circuit. Further, a bypass path is formed from the DC input terminal 18 side (cathode of the short-circuit current-interrupting diode 3) via a primary LED of the discharging photo-coupler 26 and the bypass diode 27, to the DC input terminal 17 side (the DC bus 34).

With this configuration, when the AC power is misconnected, every time the negative power is applied to the DC input terminals 17 and 18, electric current flows to the primary LED of the discharging photo-coupler 26, to turn on the secondary photo transistor, thereby discharging charges of the power capacitor 28 for the drive circuit. On the other hand, when the polarities of the DC power are reverse-connected wrongly, since the negative power is constantly applied to the DC input terminals 17 and 18, the discharging photo-coupler 26 is on all the time, and the power capacitor 28 for the drive circuit is in a discharged state all the time. Due to these effects, the power capacitor 28 for the drive circuit is not charged to a voltage, at which the semiconductor SW drive circuit 5 operates, or higher.

Thus, by configuring the semiconductor SW-off circuit 7 as shown in FIG. 4, even when the DC power or the AC power is misconnected, the semiconductor SW drive circuit 5 does not operate, the semiconductor switch 4 is controlled to turn off, and the relay 6 does not operate. Further, since the semiconductor switch 4 is turned on when the normal DC power is applied to a certain voltage or higher, the semiconductor switch 4 is not turned on with the positive half cycle of the AC power, and the input capacitors 8a and 8b are not charged. As a result, the step-up converter 29 and the inverter 14 do not operate, maintaining a safe and reliable stopped state, and even if the misconnection is corrected immediately, electrification does not occur.

INDUSTRIAL APPLICABILITY

As described above, the system interconnection inverter according to the present invention is useful as a system interconnection inverter that interconnects the DC power of the solar cell, the fuel cell, and the like to the AC power system.

The invention claimed is:

1. A system interconnection inverter comprising:
a step-up converter that steps up DC power;
an inverter that inverts an output of the step-up converter to AC power;
a pair of serially connected capacitors connected to a pair of DC buses that connects respective input terminals of the DC power to the step-up converter;
a short-circuit current-interrupting diode with a cathode connected to an input terminal of a negative bus constituting the pair of DC buses;
a semiconductor switch connected to an anode of the short-circuit current-interrupting diode;
a semiconductor switch drive circuit that drives the semiconductor switch;
a power capacitor for the semiconductor switch drive circuit that supplies operation power to the semiconductor switch drive circuit;
a semiconductor switch-off circuit that discharges the power capacitor for the semiconductor switch drive circuit when negative power is applied such that electric current flows from a cathode toward an anode of the input terminal; and
a control circuit that controls the semiconductor switch drive circuit.

2. The system interconnection inverter according to claim 1, further comprising a relay connected to opposite ends of a series circuit formed of the short-circuit current-interrupting diode and the semiconductor switch, or connected to respective opposite ends of the short-circuit current-interrupting diode and the semiconductor switch, and voltage monitors that respectively monitor respective terminal voltages of the pair of capacitors,
wherein the control circuit controls the semiconductor switch drive circuit based on the monitored voltages detected by the voltage monitors.

3. The system interconnection inverter according to claim 1, further comprising:
a power supply for the control circuit that operates the control circuit;
a power capacitor for the control circuit connected to an input terminal of the power supply for the control circuit and to the anode of the short-circuit current-interrupting diode to supply operation power for the power supply for the control circuit;
a charging diode with an anode connected to a positive input terminal and a cathode connected to a positive terminal of the power capacitor for the control circuit; and
an alarm controlled by the control circuit,
wherein the control circuit outputs a predetermined alarm signal to the alarm based on outputs of the voltage monitors, when AC power is misconnected to respective input terminals of the DC power.

4. The system interconnection inverter according to claim 1, wherein the semiconductor switch-off circuit comprises
a discharge switching element having a first terminal, a second terminal, and a control terminal, the first terminal being connected to a positive terminal of the power capacitor for the semiconductor switch drive circuit, the second terminal being connected to a negative terminal of the power capacitor for the semiconductor switch drive circuit, and the control terminal being connected to a negative input terminal of the DC power via a first predetermined resistor; and
a bypass diode connected to the pair of DC buses together with a predetermined resistor, so that the cathode side faces the positive bus,
wherein the control terminal and the second terminal of the discharge switching element are bypass-connected via a second predetermined resistor.

5. The system interconnection inverter according to claim 1, wherein the semiconductor switch-off circuit comprises
a discharging photo-coupler having a primary side photo diode and a secondary side photo transistor, a first terminal of the secondary side photo transistor being connected to a positive terminal of the power capacitor for the semiconductor switch drive circuit, and a second terminal being connected to a negative terminal of the power capacitor for the semiconductor switch drive circuit; and
a bypass diode serially connected to the primary side photo diode of the discharging photo-coupler in the same polarity and connected to the pair of DC buses together with a predetermined resistor, so that the cathode side faces the positive bus.

6. The system interconnection inverter according to claim 1, wherein the control circuit turns on a relay only after normal operation is confirmed by one or more voltage monitors to prevent bypassing the short-circuit current-interrupting diode when negative power is applied.

7. A system interconnection inverter comprising:
a converter that performs at least one of step-up and step-down of DC power;
an inverter that inverts an output of the converter to AC power;
a pair of serially connected capacitors connected to a pair of DC buses that connects respective input terminals of the DC power to the converter;

a short-circuit current-interrupting diode inserted in a direction that does not interrupt flow of electric current made to flow to the pair of DC buses by DC power connected with correct polarity, at either one of input terminals of a positive bus and a negative bus constituting the pair of DC buses;

a semiconductor switch connected to one end of the short-circuit current-interrupting diode when the other end of the short-circuit current-interrupting diode is connected to an input terminal of the DC power;

a semiconductor switch drive circuit that drives the semiconductor switch;

a power capacitor for the semiconductor switch drive circuit that supplies operation power to the semiconductor switch drive circuit;

a semiconductor switch-off circuit that discharges the power capacitor for the semiconductor switch drive circuit when negative power is applied such that electric current flows from a cathode toward an anode of the input terminal; and a control circuit that controls the semiconductor switch drive circuit.

8. The system interconnection inverter according to claim 7, further comprising a relay connected to opposite ends of a series circuit formed of the short-circuit current-interrupting diode and the semiconductor switch, or connected to respective opposite ends of the short-circuit current-interrupting diode and the semiconductor switch, and voltage monitors that respectively monitor respective terminal voltages of the pair of capacitors, wherein the control circuit controls the semiconductor switch drive circuit based on the monitored voltages detected by the voltage monitors.

* * * * *

UNITED STATES PATENT AND TRADEMARK OFFICE
CERTIFICATE OF CORRECTION

| | | |
|---|---|---|
| PATENT NO. | : 7,839,665 B2 | Page 1 of 1 |
| APPLICATION NO. | : 11/579534 | |
| DATED | : November 23, 2010 | |
| INVENTOR(S) | : Masahiro Toba | |

It is certified that error appears in the above-identified patent and that said Letters Patent is hereby corrected as shown below:

Page 1, column 1, section (86) PCT No.:, change "PCT/JP2006/006168" to --PCT/JP2006/306168--.

Signed and Sealed this
Twenty-ninth Day of March, 2011

David J. Kappos
*Director of the United States Patent and Trademark Office*